(12) United States Patent
Zhang

(10) Patent No.: US 9,599,329 B2
(45) Date of Patent: Mar. 21, 2017

(54) INFLATABLE DISPLAY WITH DYNAMIC LIGHTING EFFECT

(71) Applicant: Gemmy Industries Corporation, Coppell, TX (US)

(72) Inventor: Cheng-Chun Zhang, Shenzhen (CN)

(73) Assignee: Gemmy Industries Corp., Coppell, TX (US)

( * ) Notice: Subject to any disclaimer, the term of this patent is extended or adjusted under 35 U.S.C. 154(b) by 0 days.

(21) Appl. No.: 14/145,512

(22) Filed: Dec. 31, 2013

(65) Prior Publication Data
US 2015/0184844 A1    Jul. 2, 2015

(51) Int. Cl.
*F21V 33/00*    (2006.01)
*A63H 3/06*    (2006.01)
*F21S 10/00*    (2006.01)
*F21V 13/02*    (2006.01)
*F21V 17/02*    (2006.01)
(Continued)

(52) U.S. Cl.
CPC ......... *F21V 33/0028* (2013.01); *A63G 31/12* (2013.01); *A63H 3/006* (2013.01); *A63H 3/06* (2013.01); *A63H 27/10* (2013.01); *F21S 10/007* (2013.01); *F21V 5/00* (2013.01); *F21V 13/02* (2013.01); *F21V 17/02* (2013.01); *F21V 29/73* (2015.01); *F21V 31/04* (2013.01); *A63H 2027/1033* (2013.01); *A63H 2027/1058* (2013.01); *F21S 10/02* (2013.01); *F21V 3/026* (2013.01); *F21V 5/008* (2013.01); *F21V 5/04* (2013.01); *F21V 13/12* (2013.01); *F21W 2121/006* (2013.01); *F21Y 2101/00* (2013.01);
(Continued)

(58) Field of Classification Search
CPC ........ F21S 10/026; F21S 10/046; F21S 10/06; F21S 10/063; F21S 10/066; F21V 14/02; F21V 14/025; F21V 14/06; F21V 14/065; F21V 3/026; F21V 5/004; F21W 2121/00
USPC ......................................... 362/96, 121, 186
See application file for complete search history.

(56) References Cited

U.S. PATENT DOCUMENTS 3,263,069 A    7/1966  Krucki et al.
3,949,350 A    4/1976  Smith
(Continued)

OTHER PUBLICATIONS

Office Action issued Apr. 9, 2015 in U.S. Appl. No. 14/098,594.
(Continued)

*Primary Examiner* — Anh Mai
*Assistant Examiner* — Steven Horikoshi
(74) *Attorney, Agent, or Firm* — Venable LLP; Steven J. Schwarz

(57) ABSTRACT

An inflatable display with dynamic lighting effect has an inflatable body, an air pump inflating the inflatable body, and a lighting assembly mounted inside the inflatable body for providing dynamic lighting variations. The lighting assembly has a light housing, a power supply, a lighting module, and a refracting module mounted in the light housing. The lighting module and the refracting module rotate relative to each other. As light beams emitted from the lighting module pass through the refracting module, the light beams are mixed and refracted. With relative rotation of the lighting module and the refracting module, the light beams can project outwards to further penetrate through the inflatable body at different angles covering a large area to form the dynamic lighting variations and to exhibit the dynamic lighting effect.

7 Claims, 6 Drawing Sheets

(51) Int. Cl.

| | | |
|---|---|---|
| F21V 31/04 | (2006.01) | |
| F21V 5/00 | (2015.01) | |
| A63H 27/10 | (2006.01) | |
| A63G 31/12 | (2006.01) | |
| A63H 3/00 | (2006.01) | |
| F21V 29/73 | (2015.01) | |
| F21V 5/04 | (2006.01) | |
| F21W 121/00 | (2006.01) | |
| F21S 10/02 | (2006.01) | |
| F21V 3/02 | (2006.01) | |
| F21V 13/12 | (2006.01) | |
| F21Y 101/00 | (2016.01) | |

(52) U.S. Cl.
CPC ........ *F21Y 2113/13* (2016.08); *F21Y 2115/10* (2016.08)

(56) References Cited

U.S. PATENT DOCUMENTS

| | | | |
|---|---|---|---|
| 4,249,331 A * | 2/1981 | Vernon | F21S 10/06 40/432 |
| 4,870,548 A | 9/1989 | Beachy et al. | |
| 5,688,042 A * | 11/1997 | Madadi | F21K 9/135 362/240 |
| 6,474,837 B1 * | 11/2002 | Belliveau | F21L 4/027 362/231 |
| 6,786,793 B1 * | 9/2004 | Wang | 446/226 |
| 7,033,037 B2 | 4/2006 | Chen | |
| 7,063,553 B1 | 6/2006 | Mullen | |
| 7,320,533 B1 | 1/2008 | Beadle | |
| 8,262,252 B2 | 9/2012 | Bergman et al. | |
| 2003/0231497 A1 | 12/2003 | Sakata et al. | |
| 2005/0243560 A1 * | 11/2005 | Chen | 362/328 |
| 2007/0097681 A1 * | 5/2007 | Chich et al. | 362/232 |
| 2009/0122548 A1 | 5/2009 | Dalsgaard | |
| 2009/0268466 A1 | 10/2009 | Allegri | |
| 2010/0091491 A1 | 4/2010 | Jiang et al. | |
| 2011/0194292 A1 | 8/2011 | Tsai | |
| 2011/0286200 A1 | 11/2011 | Iimura et al. | |
| 2012/0147609 A1 * | 6/2012 | Black et al. | 362/360 |
| 2012/0182743 A1 * | 7/2012 | Chou | 362/351 |
| 2012/0300429 A1 | 11/2012 | Jin | |
| 2013/0094193 A1 | 4/2013 | Baxter et al. | |
| 2014/0001507 A1 | 1/2014 | Streppel et al. | |

OTHER PUBLICATIONS

Notice of Allowance issued Feb. 27, 2015 in U.S. Appl. No. 14/079,628.

Office Action issued Sep. 23, 2016 in related U.S. Appl. No. 15/200,291.

* cited by examiner

INFLATABLE DISPLAY WITH DYNAMIC LIGHTING EFFECT

BACKGROUND OF THE INVENTION

1. Field of the Invention

The present invention relates to an inflatable display, especially to an inflatable display with dynamic lighting effect.

2. Description of the Prior Art(s)

Inflatable displays are normally used for occasions of all kinds of exhibitions, carnivals, and parties. Based on means of application and displaying, the inflatable displays can be classified into a stationary type and a wearable type. The stationary type of inflatable displays pertains to inflatable displays that are fixedly mounted in fields of the foregoing occasions. The wearable type of inflatable displays pertains to outfits that are worn by performers for purpose of decoration, advertisement, and entertainment.

A conventional inflatable display has an inflatable body and an air pump for inflating the inflatable body. As the conventional inflatable display is not luminous, entertaining and decorative effects of the conventional inflatable display are limited. Moreover, since many activities, such as Halloween parties, are held in a dusky occasion with dim light, the conventional inflatable display does not fit the dusky occasion.

In order to enhance the entertaining and the decorative effects of the conventional inflatable display, a lighting unit is mounted inside the inflatable body of the conventional inflatable display. However, the lighting unit only illuminates the conventional inflatable display, or flickers so as to generate lighting variations of the lighting unit. The lighting variations are limited and the entertaining and the decorative effects of the conventional inflatable displays are still not improved efficiently.

To overcome the shortcomings, embodiments of the present invention provide an inflatable display with dynamic lighting effect.

SUMMARY OF THE INVENTION

Embodiments of the present invention provide an inflatable display with dynamic lighting effect. The inflatable display has an inflatable body, an air pump inflating the inflatable body, and a lighting assembly mounted inside the inflatable body for providing dynamic lighting variations. The lighting assembly has a light housing, a power supply, a lighting module, and a refracting module mounted in the light housing. The lighting module and the refracting module rotate relative to each other.

As light beams emitted from the lighting module pass through the refracting module, the light beams are mixed and refracted. With relative rotation of the lighting module and the refracting module, the light beams can project outwards to further penetrate through the inflatable body at different angles covering a large area to form the dynamic lighting variations and to exhibit the dynamic lighting effect.

Other objectives, advantages and novel features of the invention will become more apparent from the following detailed description when taken in conjunction with the accompanying drawings.

DETAILED DESCRIPTION

Figure 1:
FIG. 1 is a perspective view of a first embodiment of an inflatable display with dynamic lighting effect in accordance with an embodiment of the present invention.

With reference to FIG. 1, in a first embodiment, an inflatable display with dynamic lighting effect in accordance with the present invention comprises an inflatable body 10, an air pump 20, and a lighting assembly 30.

The inflatable body 10 is transparent and has an inner wall and an air inlet. The air inlet is formed through the inflatable body 10. Preferably, the air inlet is formed through a bottom of the inflatable body 10.

The air pump 20 is mounted to the air inlet of the inflatable body 10 and has a power cord 21. The power cord 21 of the air pump 20 is connected to an external power source, such as a mains power, to provide an operating power to the air pump 20 so as to inflate the inflatable body 10. Preferably, the air pump 20 is mounted on and supported by a seat 22. Alternatively, the operating power of the air pump 20 may be supplied from batteries.

Figure 2:
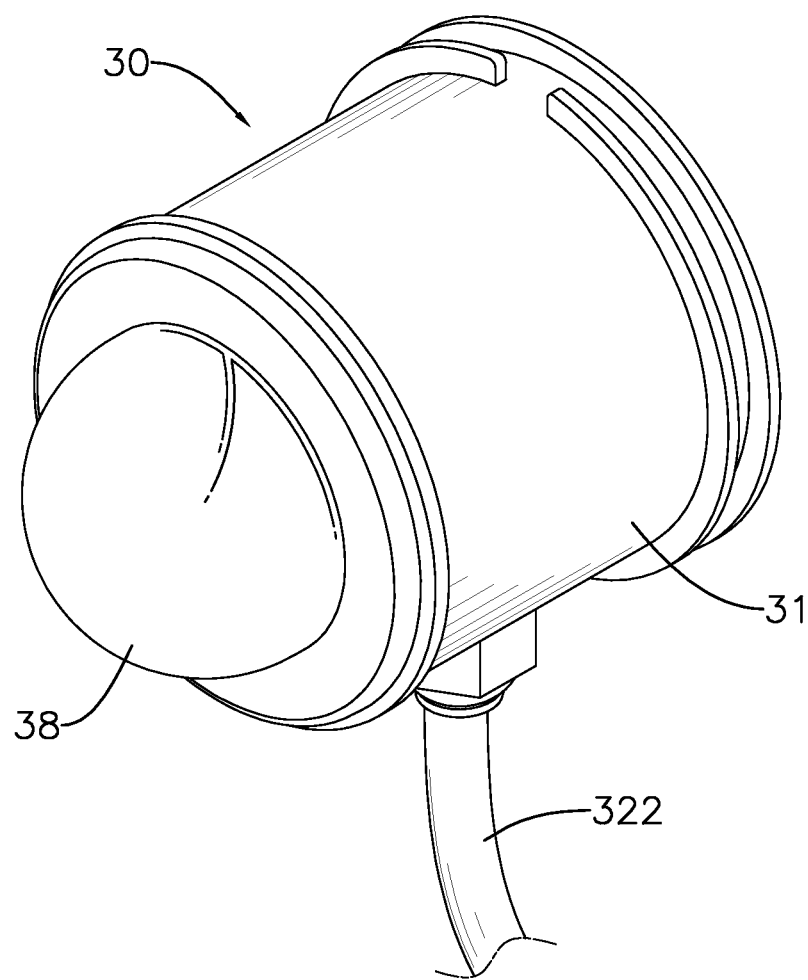
FIG. 2 is a perspective view of a lighting assembly of the inflatable display of FIG. 1.
Figure 3:
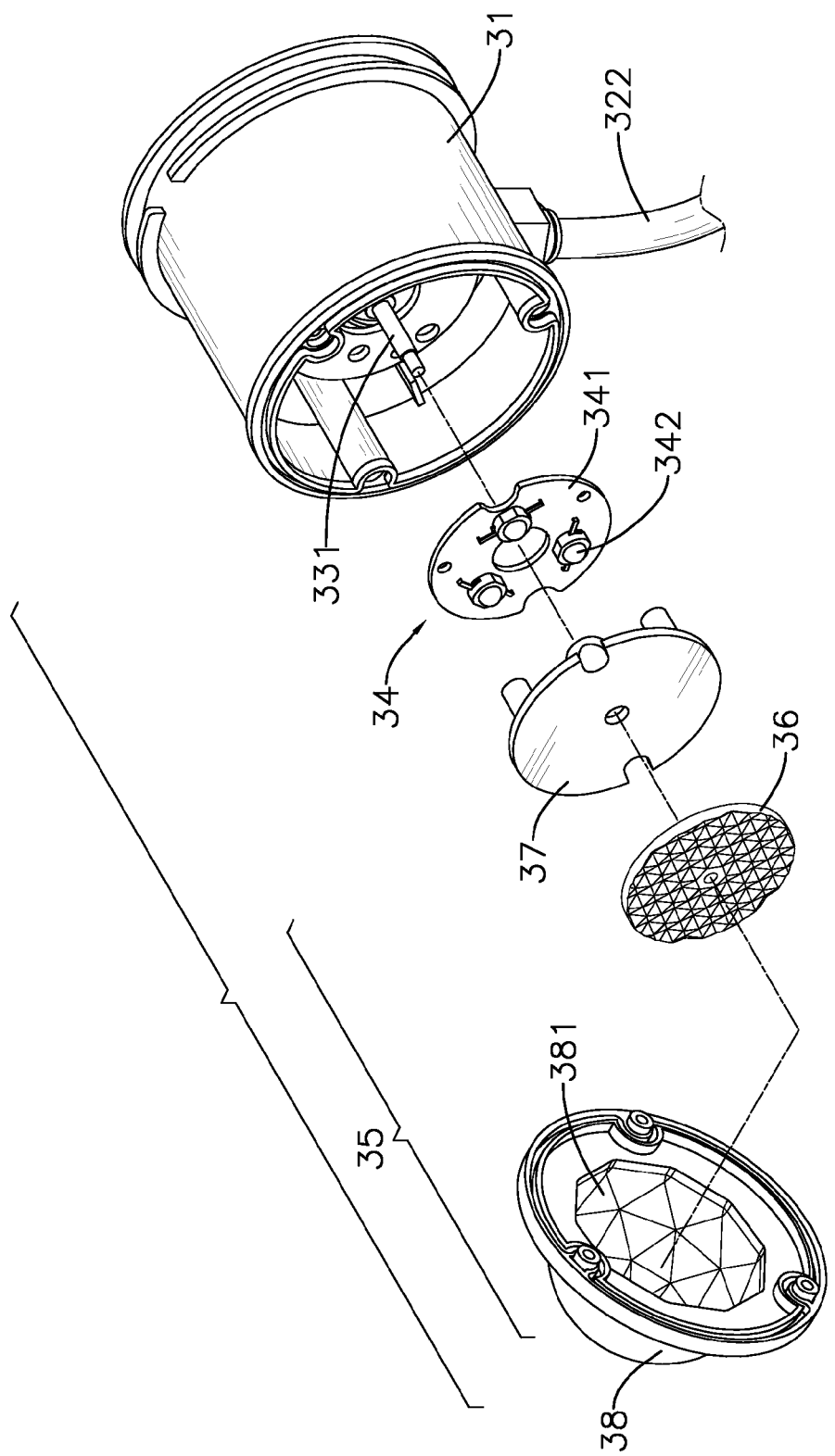
FIG. 3 is an exploded perspective view of the lighting assembly of the inflatable display of FIG. 1.
Figure 4:
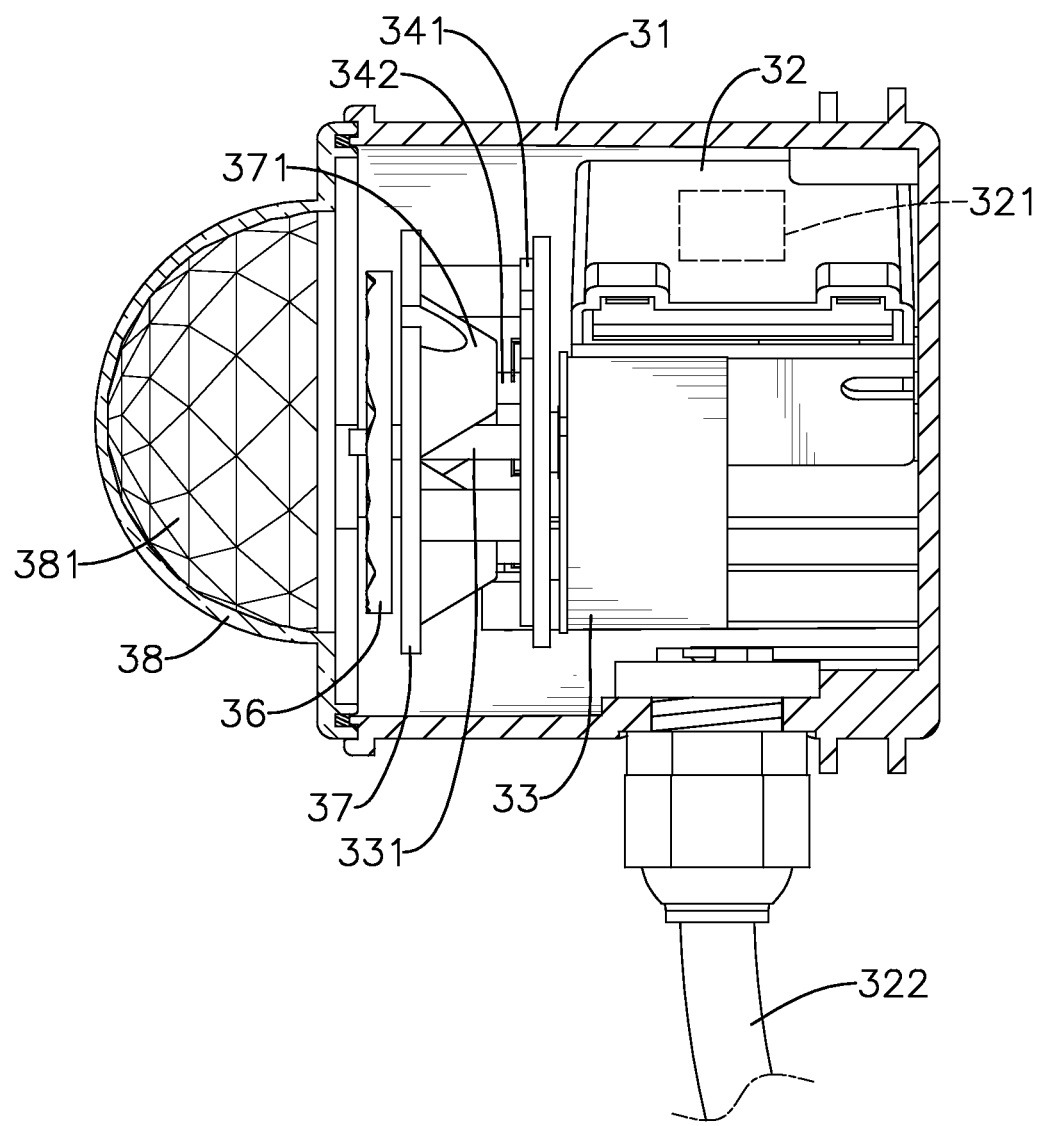
FIG. 4 is a side view in partial section of the lighting assembly of the inflatable display of FIG. 1.

With further reference to FIGS. 2 to 4, the lighting assembly 30 is mounted in the inflatable body 10 on the inner wall of the inflatable body 10, and has a light housing 31, a power supply 32, a motor 33, a lighting module 34, and a refracting module 35.

According to an embodiment, the light housing 31 is hollow and has a front open end and a rear closed end.

The power supply 32 is mounted in the light housing 31, and has a power adapter 321 and a power cord 322. The power adapter 321 converts alternating current (AC) to direct current (DC). The power cord 322 of the power supply 32 is electrically connected to the power adapter 321, extends out of the light housing 31, and is electrically connected to an external power source. Preferably, the power cord 322 of the power supply 32 is electrically connected with the power cord 21 of the air pump 20, and is connected to the external power source via the power cord 21 of the air pump 20.

The motor 33 is mounted in the light housing 31, is electrically connected to the power adapter 321 of the power supply 32, and has a driving shaft 331. The driving shaft 331 protrudes toward the front open end of the light housing 31, and is driven to rotate by the motor 31. The driving shaft 331 may continuously rotate in a specific direction or may rotate back and forth.

The lighting module 34 and the refracting module 35 rotate relative to each other. Specifically, in the first preferred embodiment, the lighting module 34 is mounted in the light housing 31, is electrically connected to the power adapter 321 of the power supply 32, is disposed between the front open end of the light housing 31 and the motor 33, and has a circuit board 341 and multiple light emitting diodes (LEDs) 342. The circuit board 341 is annular, is disposed around the driving shaft 331 of the motor 33, is electrically connected to the power adapter 321 of the power supply 32, and has a front surface and a control unit. The front surface of the circuit board 341 faces the front open end of the light housing 31. The LEDs 342 can emit light beams in different colors, are electrically mounted on the front surface of the circuit board 341 and are controlled by the control unit of the circuit board 341 so as to form a specific lighting mode, such as a flicker mode (each of the LEDs 342 flickers) or a normal mode (each of the LEDs 342 shines continuously).

The refracting module 35 is mounted on the front open end of the light housing 31. The refracting module 35 has a refractive lens 36, a condenser 37, and a light shade 38. The refractive lens 36 is disposed between the front open end of the light housing 31 and the lighting module 34, is securely attached to the driving shaft 331 of the motor 33, and is driven to rotate by the driving shaft 331 of the motor 31. The refractive lens 36 has a front surface. The front surface of the refractive lens 36 faces the front open end of the light housing 31, is irregular and rough, and includes multiple refractive surfaces being planar and inclined at different angles. The condenser 37 is disposed around the driving shaft 331 of the motor 33 and between the refractive lens 36 and the lighting module 34. The condenser 37 has a rear surface and multiple cone protrusions 371. The rear surface of the condenser 37 faces the lighting module 34. The cone protrusions 371 are separately formed on and protrude from the rear surface of the condenser 37, and respectively correspond in position to the LEDs 342 of the lighting module 34. The light shade 38 is hemispherical, caps the light housing 31, and is mounted on and securely attached to the front open end of the light housing 31. The light shade 38 has an inner surface and a beam-splitter lens portion 381. The beam-splitter lens portion 381 is formed on the inner surface of the light shade 38 and includes multiple convex lens units.

In use, the power cord 322 of the power supply 32 that is connected to the external power source transmits the AC to the power adapter 321, and the power adapter 321 converts the AC to DC for supplying electrical power to the motor 33 and the lighting module 34.

Thus, the LEDs 342 emit light beams in different colors and the light beams penetrate through the cone protrusions 371 of the condenser 37. The cone protrusions 371 of the condenser 37 condense and then diffuse the light beams to allow the light beams from the LEDs 342 to further penetrate through the refractive lens 36. In the meantime, the refractive lens 36 is driven to rotate by the driving shaft 331 of the motor 33. As the light beams from the LEDs 342 pass through the refractive lens 36, the light beams in different colors are mixed and then further penetrate through the beam-splitter lens portion 381 of the light shade 38 to allow the light beams from the LEDs 342 to be refracted again by the convex lens units of the beam-splitter lens portion 381 of the light shade 38.

With flickering of the LEDs 342 and rotation of the refractive lens 36, the light beams that pass through the light shade 38 can project outwards to further penetrate through the inflatable body 10 at different angles covering a large area to form a dynamic lighting variation and to exhibit a dynamic lighting effect. Moreover, as the mounting position of the lighting assembly 30 in the inflatable body 10 changes, the lighting effects created on the inflatable body 10 differs as well.

Figure 5:
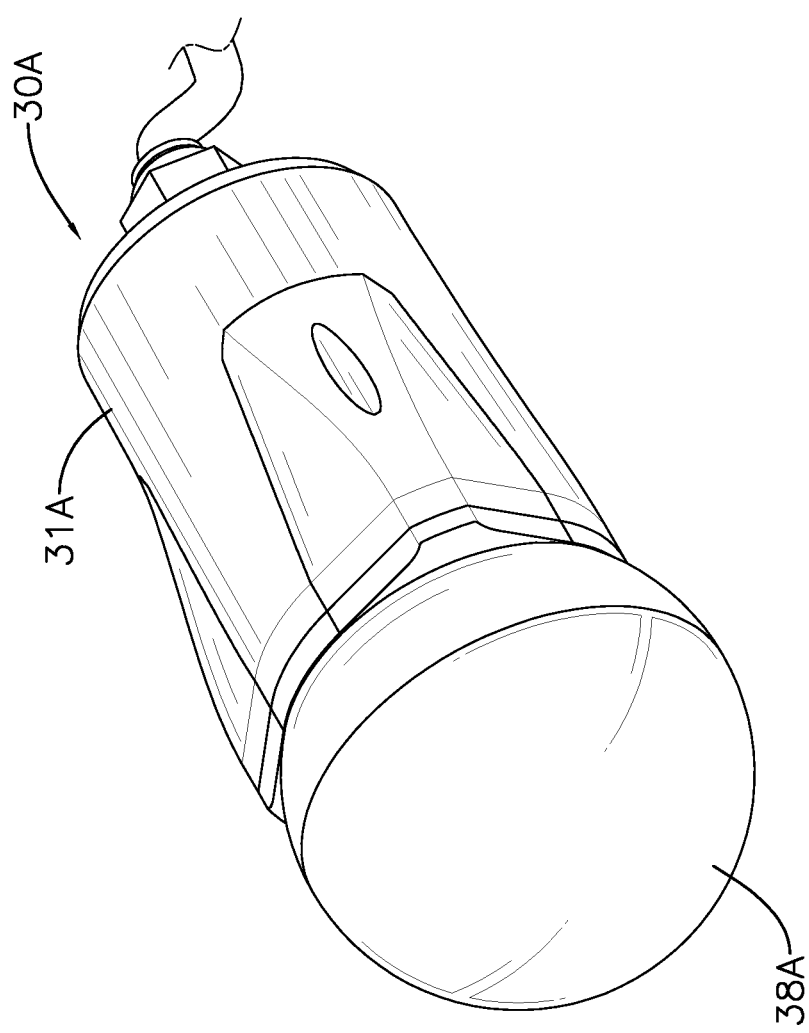
FIG. 5 is a perspective view of a lighting assembly of a second embodiment of an inflatable display with dynamic lighting effect in accordance with an embodiment of the present invention.
Figure 6:
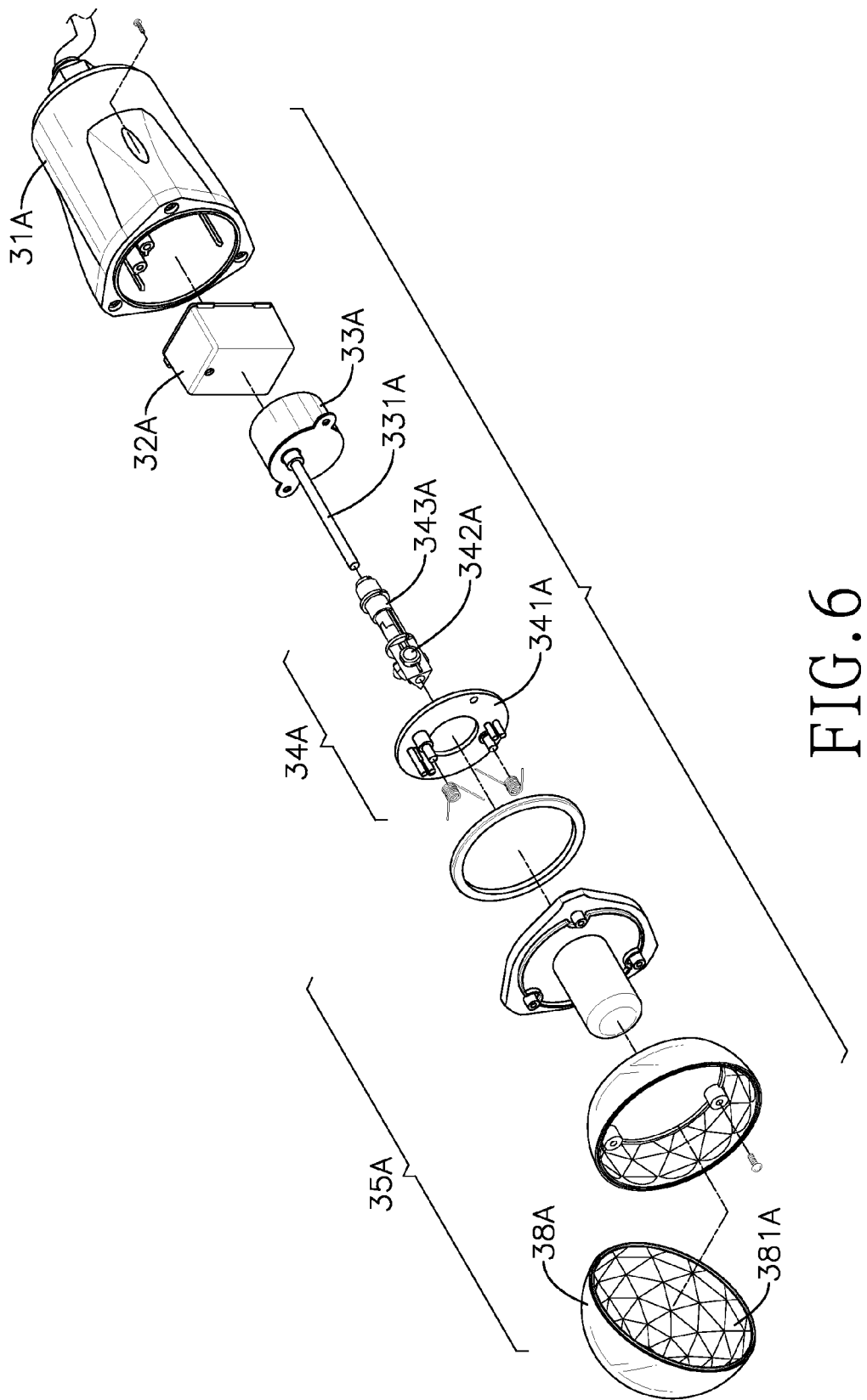
FIG. 6 is an exploded perspective view of the lighting assembly of the inflatable display of FIG. 5.

With reference to FIGS. 5 and 6, in a second preferred embodiment, the lighting module 34A of the lighting assembly 30A has an LED module 343A and a circuit board 341A. The LED module 343A is tubular, is mounted around and attached to the driving shaft 331A of the motor 33A, and is driven to rotate back and forth by the driving shaft 331A of the motor 33A. The LED module 343A has multiple LEDs 342A that can emit light beams in different colors. The circuit board 341A is annular, is disposed around the LED module 343A, and is electrically connected to the LED module 343A and the power supply 32A. The refracting module 35A of the lighting assembly 30A has a light shade 35A. The light shade 35A is spherical, is mounted on and securely attached to the front open end of the light housing 31A, and has an inner surface and a beam-splitter lens portion 381A. The beam-splitter lens portion 381A is formed on the inner surface of the light shade 38A and includes multiple convex lens units.

The light beams from the LEDs 342A penetrate through the beam-splitter lens portion 381A of the light shade 38A to allow the light beams from the LEDs 342A to be refracted by the convex lens units of the beam-splitter lens portion 381A of the light shade 38A. With flickering of the LEDs 342A and rotation of the LED module 343A, the lighting assembly 30A forms a dynamic lighting variation and exhibits a dynamic lighting effect.

The inflatable display with the dynamic lighting effect is entertaining irrespective of whether it is fixedly mounted on a site of an occasion or worn by a wearer, and can be more entertaining when used in a dusky occasion with dim light, such as a Halloween party. The inflatable display with the dynamic lighting effect has improved entertaining and decorative effects.

Even though numerous characteristics and advantages of the present invention have been set forth in the foregoing description, together with details of the structure and features of the invention, the disclosure is illustrative only. Changes may be made in the details, especially in matters of shape, size, and arrangement of parts within the principles of the invention to the full extent indicated by the broad general meaning of the terms in which the appended claims are expressed.

What is claimed is:

1. An inflatable display with dynamic lighting effect comprising:
    an inflatable body having an air inlet formed through the inflatable body;
    an air pump mounted to the air inlet of the inflatable body; and
    a lighting assembly located in the inflatable body, the lighting assembly comprising:
        a light housing defining a hollow interior and having a front open end and a rear closed end;
        a power supply located in the light housing;
        a lighting module located in the light housing and electrically connected to the power supply, the lighting module comprising a circuit board including a control unit, the circuit board defining a front surface with multiple light-emitting diodes (LEDs) electrically mounted thereto, the circuit board defining a central opening;
        a motor located in the light housing between the lighting module and the rear closed end of the light housing, and electrically connected to the power supply, the motor having a driving shaft protruding toward the open front end of the light housing through the central aperture in the circuit board;
        a refractive lens attached to the driving shaft of the motor, the refractive lens having a front surface facing away from the rear closed end of the light housing, the front surface including multiple refractive surfaces, wherein the refractive surfaces are planar and inclined at different angles from one another; and a light shade mounted on the front open end of the light housing and including a beam-splitter lens portion formed on the inner surface of the light shade and including multiple convex lens units, the inner surface including multiple convex units directed toward the front surface including refractive surfaces of the refractive lens;

wherein the driving shaft of the motor rotates the refractive lens with respect to the light shade and the lighting module.

2. The inflatable display as claimed in claim 1, further comprising:

a condenser disposed around the driving shaft of the motor between the refractive lens and the lighting module, the condenser having a rear surface facing the lighting module with multiple cone protrusions separately formed on and protruding from the rear surface of the condenser;

wherein the multiple cone protrusions correspond in position to the LEDs of the lighting module.

3. The inflatable display as claimed in claim 1, wherein the light shade is hemispherical.

4. The inflatable display of claim 1, wherein the inflatable body is transparent.

5. The inflatable display of claim 1, wherein the inflatable body defines an inner wall, and the lighting assembly is mounted to the inner wall.

6. The inflatable display of claim 1, wherein the control unit is adapted to control the LEDs in a first mode where the LEDs emit light continuously, or in a second mode where the LEDs flicker.

7. The inflatable display of claim 1, wherein the LEDs emit light beams in different colors.

\* \* \* \* \*